(12) United States Patent
Brigham et al.

(10) Patent No.: US 8,179,362 B2
(45) Date of Patent: May 15, 2012

(54) STEREOSCOPIC 3D LIQUID CRYSTAL DISPLAY APPARATUS WITH SCANNING BACKLIGHT

(75) Inventors: Scott E. Brigham, Maplewood, MN (US); John C. Schultz, Afton, MN (US); Billy L. Weaver, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 942 days.

(21) Appl. No.: 11/865,967

(22) Filed: Oct. 2, 2007

(65) Prior Publication Data

US 2008/0084519 A1 Apr. 10, 2008

Related U.S. Application Data

(60) Provisional application No. 60/828,399, filed on Oct. 6, 2006.

(51) Int. Cl.
*G09G 3/36* (2006.01)
(52) U.S. Cl. ........ 345/102; 345/211; 345/213; 345/690; 362/613; 362/612; 362/616
(58) Field of Classification Search .................... 345/87, 345/102, 211–214, 204, 690; 362/613, 606, 362/607, 620, 619, 625, 626, 339, 336, 338
See application file for complete search history.

(56) References Cited

U.S. PATENT DOCUMENTS

| 5,897,184 A | 4/1999 | Eichenlaub et al. |
| 5,929,951 A | 7/1999 | Sasakura et al. |
| 6,271,896 B2 | 8/2001 | Moseley et al. |
| 6,473,141 B2 | 10/2002 | Moseley et al. |
| 6,618,530 B1 | 9/2003 | Lundin |
| 6,831,624 B1 | 12/2004 | Harrold |
| 6,970,290 B1 | 11/2005 | Mashitani et al. |

(Continued)

FOREIGN PATENT DOCUMENTS

JP 2005-266293 9/2005

(Continued)

OTHER PUBLICATIONS

Ishikawa et al. "New Design for a Highly Collimating Turning Film," Eastman Kodak Company, SID 06 Digest, p. 514-517, 2006.

*Primary Examiner* — Quan-Zhen Wang
*Assistant Examiner* — Jennifer Nguyen

(57) ABSTRACT

A scanning backlight for a stereoscopic 3D liquid crystal display apparatus includes a light guide having a first side and a second side opposite the first side, and having a first surface extending between the first and second sides and a second surface opposite the first surface. The first surface substantially re-directs light and the second surface substantially transmits light. A plurality of first light sources are arranged along the first side of the light guide for transmitting light into the light guide from the first side and a plurality of second light sources are arranged along the second side of the light guide for transmitting light into the light guide from the second side. The first light sources are divided into a plurality of first groups and the second light sources are divided into a plurality of second groups, each first group having a corresponding and opposing second group, and the first groups and second groups are selectively turned on and off in a particular pattern where only the first group or corresponding and opposing second group selectively transmits light into light guide at one time.

18 Claims, 3 Drawing Sheets

U.S. PATENT DOCUMENTS

| | | |
|---|---|---|
| 7,057,638 B1 | 6/2006 | Yuuki et al. |
| 7,210,836 B2 * | 5/2007 | Sasagawa et al. ............. 362/606 |
| 7,286,193 B2 * | 10/2007 | Yoo et al. ........................ 349/62 |
| 7,530,721 B2 | 5/2009 | Mi et al. |
| 7,677,733 B2 * | 3/2010 | Brott ................................ 353/7 |
| 7,800,708 B2 * | 9/2010 | Brott et al. ...................... 349/61 |
| 2001/0001566 A1 | 5/2001 | Moseley et al. |
| 2002/0005921 A1 | 1/2002 | Sasakura et al. |
| 2002/0126389 A1 | 9/2002 | Moseley et al. |
| 2004/0046910 A1 | 3/2004 | Sasakura et al. |
| 2004/0130884 A1 | 7/2004 | Yoo et al. |
| 2005/0052750 A1 | 3/2005 | King et al. |
| 2005/0073625 A1 * | 4/2005 | Daiku et al. .................... 349/64 |
| 2005/0276071 A1 | 12/2005 | Sasagawa et al. |
| 2005/0280894 A1 | 12/2005 | Hartkop et al. |
| 2006/0050047 A1 | 3/2006 | Jin et al. |
| 2006/0132673 A1 | 6/2006 | Ito et al. |
| 2006/0262558 A1 * | 11/2006 | Cornelissen .................. 362/613 |
| 2007/0126691 A1 | 6/2007 | Lin et al. |

FOREIGN PATENT DOCUMENTS

| | | |
|---|---|---|
| WO | WO 2004/008226 | 1/2004 |
| WO | WO 2004/027492 | 4/2004 |
| WO | WO 2005/088599 | 9/2005 |

* cited by examiner

STEREOSCOPIC 3D LIQUID CRYSTAL DISPLAY APPARATUS WITH SCANNING BACKLIGHT

CROSS-REFERENCE TO RELATED APPLICATION

This application claims the benefit of U.S. Provisional Application Ser. No. 60/828,399 filed Oct. 6, 2006.

FIELD

The present disclosure relates to a backlit liquid crystal display apparatus and particularly to displaying stereo 3D images using liquid crystal display apparatus with a scanning backlight.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

Turning on the light source to light the first or right image at time t=0 provides light to the right image. At time t=16.67 ms (typical 60 Hz refresh rate) the second or left image starts to be put in place. The second image replaces the first image and can take 16.67 ms to complete the transformation. Current systems turn off all the light sources that illuminate the first or right image and then turn on all the light sources that illuminate the second or left image at sometime during the second image transformation. This can lead to "cross-talk" or "ghosting" of the first or right image in the second or left image, degrading the stereoscopic 3D effect.

BRIEF SUMMARY

The present disclosure relates to a backlit liquid crystal display apparatus and particularly to displaying stereo 3D images using liquid crystal display apparatus with a scanning backlight.

In a first embodiment, a scanning backlight for a stereoscopic 3D liquid crystal display apparatus includes a light guide having a first side and a second side opposite the first side, and having a first surface extending between the first and second sides and a second surface opposite the first surface. The first surface substantially re-directs light and the second surface substantially transmits light. A plurality of first light sources are arranged along the first side of the light guide for transmitting light into the light guide from the first side and a plurality of second light sources are arranged along the second side of the light guide for transmitting light into the light guide from the second side. The first light sources are divided into a plurality of first groups and the second light sources are divided into a plurality of second groups, each first group having a corresponding and opposing second group, and the first groups and second groups are selectively turned on and off in a particular pattern where only the first group or corresponding and opposing second group selectively transmits light into light guide at one time.

In another embodiment, a stereoscopic 3D liquid crystal display apparatus includes a liquid crystal display panel, drive electronics configured to drive the liquid crystal display panel with alternating left eye and right eye images, and a backlight positioned to provide light to the liquid crystal display panel. The backlight includes a light guide having a first side and a second side opposite the first side, and having a first surface extending between the first and second sides and a second surface opposite the first surface. The first surface substantially re-directs light and the second surface substantially transmits light. A plurality of first light sources are arranged along the first side of the light guide for transmitting light into the light guide from the first side, and a plurality of second light sources arranged along the second side of the light guide for transmitting light into the light guide from the second side. The first light sources are divided into a plurality of first groups and the second light sources are divided into a plurality of second groups, each first group having a corresponding and opposing second group, and the first groups and second groups are selectively turned on and off in a particular pattern where only the first group or corresponding and opposing second group selectively transmits light into light guide at one time.

In a further embodiment, a method of displaying a 3D image on a liquid crystal display apparatus including providing right and left images to a liquid crystal display panel in an alternating fashion, and illuminating the liquid crystal display panel with a scanning backlight.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
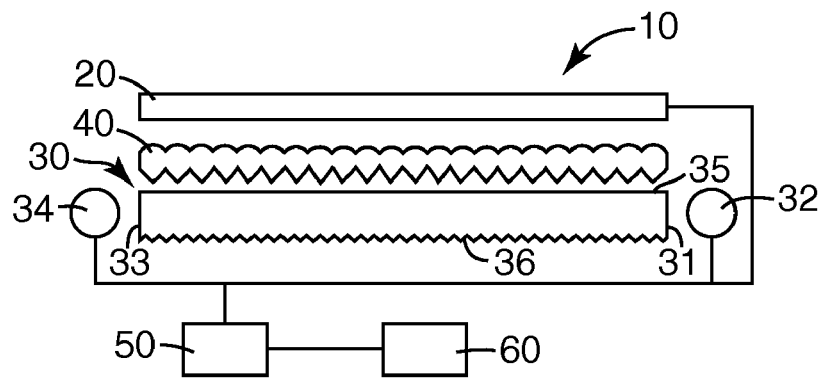
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

The present disclosure relates to a backlit liquid crystal display apparatus and particularly to a scanning backlight for a stereoscopic 3D liquid crystal display apparatus. This apparatus can provide a 3D image with reduced "ghosting" from one image to the next. Ghosting is created when all or a portion of the LCD panel has not been completely erased of the previous image and the directional backlight is switched. For example, if the left image is displayed with the left image light source, ghosting will occur if the right image light source is turned on before the display is either made black or the right image becomes stable on the display.

This disclosure presents a light source sequencing that provides an improved 3D image to a viewer. Instead of turning all the light emitting diodes (i.e., LEDs) on one side of the backlight on or off at one time, a different sequencing divides the light sources into "segments", "groups", or "banks" of two three, or more, and the backlight control synchronizes turning on the light source with the presence of valid image data on the display.

One or more of these embodiments may be combined in a single display capable of providing a 3D visualization capability from a flat display either in a shutter glasses stereoscopic 3D display mode or in an autostereoscopic display mode. While the present invention is not so limited, an appreciation of various aspects of the invention will be gained through a discussion of the examples provided below.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

FIG. 1 is a schematic side view of an illustrative display apparatus 10. The display apparatus includes a liquid crystal display panel 20 and a scanning backlight 30 positioned to provide light to the liquid crystal display panel 20. The scanning backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz. A double sided prism film 40 is disposed between the liquid crystal display panel 20 and the scanning backlight 30.

The liquid crystal display panel 20 and/or scanning backlight 30 can have any useful shape or configuration. In many embodiments, the liquid crystal display panel 20 and scanning backlight 30 has a square or rectangular shape. However, in some embodiments, the liquid crystal display panel 20 and/or scanning backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the scanning backlight 30 plurality of first and second light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The scanning backlight 30 can be any useful scanning backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated scanning backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33 and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

In many embodiments, the first surface 36 includes a plurality of extraction elements such as, for example, linear prism or lenticular features as shown. In many embodiments, the linear prism or lenticular features can extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The scanning backlight can be a single layer of optically clear material with light sources at both ends or two (or more) layers of optically clear material with a light source per layer which preferentially extract light in a desired direction for each layer.

The double sided prism film 40 can be any useful prism film having a linear lenticular structure on a first side and a linear prismatic structure on an opposing side. The linear lenticular structure and the linear prism structure are parallel. The double sided prism film 40 transmits light from the scanning backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
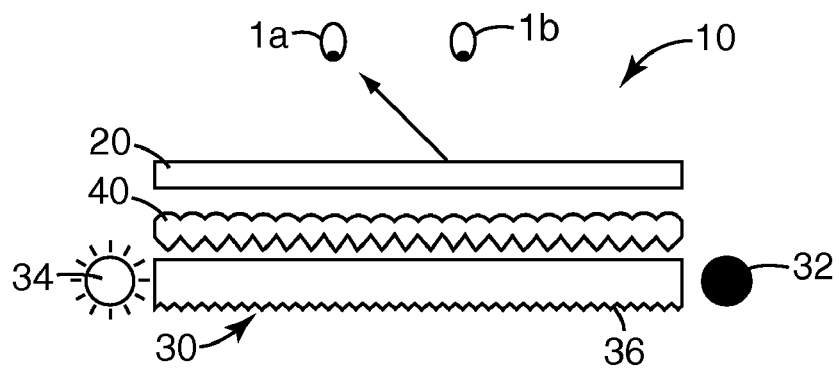
FIG. 2A and FIG. 2B are schematic side views of an illustrative display apparatus in operation.
Figure 2B:
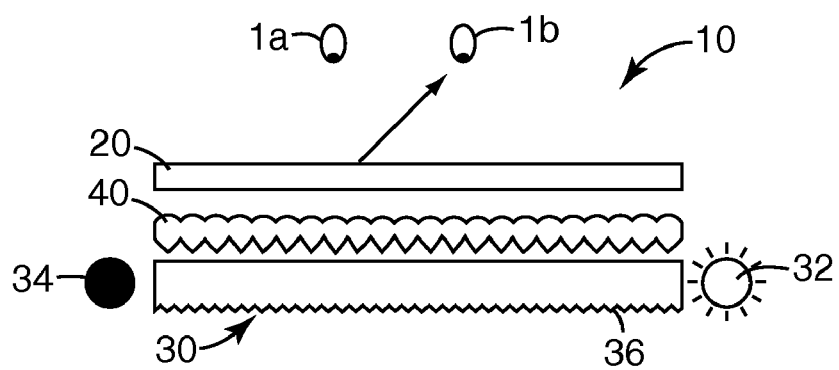

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the scanning backlight 30, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the scanning backlight 30, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

Liquid crystal display panels 20 have a refresh or image update rate that is variable, but for the purposes of this example, a 60 Hz refresh rate is presumed. This means that a new image is presented to the viewer every ¹⁄₆₀ second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turns on all the second plurality of light sources sometime during this transition, typically resulting in a display with low brightness because the image data must be stable or reasonably so over the entire image if the sequential left and right images are not to be illuminated with the incorrect light source which will lead to 3D cross talk and a poor 3D viewing experience.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

The present disclosure describes a different light source sequencing that provides a better 3D image to the viewer with reduced "ghosting" from one image to the next. Instead of turning all the LEDs on one side of the backlight on or off at one time, the disclosed sequencing divides the light sources into "segments", "groups", or "banks" of two three, or more on each side of the light guide, and the backlight control synchronizes turning on each light source bank or group and each first side light source 32 or second side light source 34, with the presence of valid image data on the display.

Figure 3:
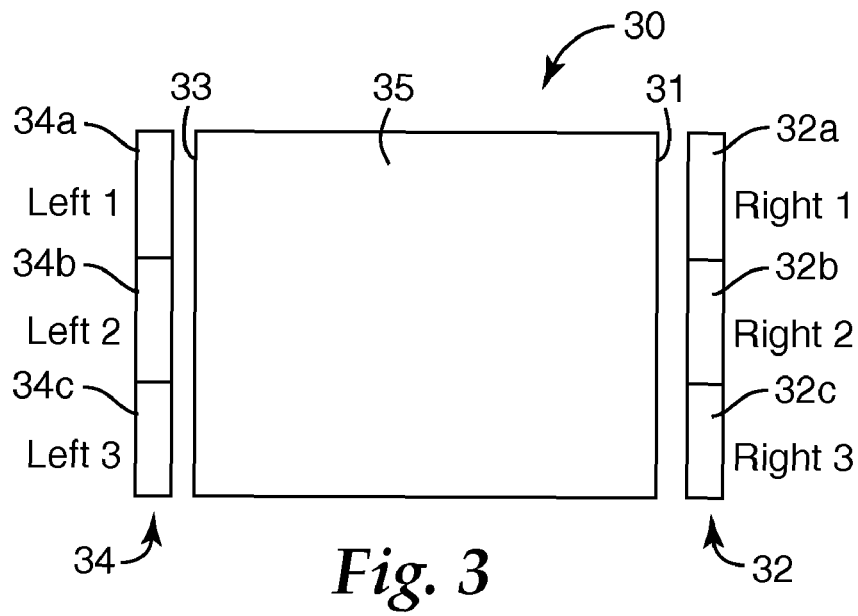
FIG. 3 is a schematic diagram front view of an illustrative scanning backlight for displaying alternating right and left images.

FIG. 3 is a schematic diagram front view of an illustrative scanning backlight 30 for displaying alternating right and left images forming a perceived 3D image. The scanning backlight 30, as described above, includes a first side 31 or first light input surface 31 adjacent to the plurality of first light sources 32 or right eye image solid state light source 32, and an opposing second side 33 or second light input surface 33 adjacent to the plurality of second light sources 34 or left eye image solid state light source 34. A first surface (shown in FIG. 1) extends between the first side 31 and second side 33 and a second surface 35, opposite the first surface, extends between the first side 31 and second side 33. The first surface substantially re-directs (e.g., reflects, extracts, and the like) light and the second surface 35 substantially transmits light to the double sided prism film and LCD panel, as described in FIG. 1.

In the illustrated embodiment, the plurality of first light sources 32 or right eye image solid state light source 32 is divided into three groups 32a, 32b, 32c. Each group 32a, 32b, 32c has any useful number of light sources that are simultaneously turned on and off as a group. More than three groups are possible and may be preferred to increase the ON time for any particular group as a fraction of the image display time; however, the example of three groups illustrates the general concept. In other embodiments, the plurality of first light sources 32 or right eye image solid state light source 32 is divided into more than three groups such as, for example, four, five, six, seven, eight, nine, or ten groups or more, as desired. In one particular embodiment, the plurality of first light sources 32 or right eye image solid state light source 32 is divided into 6 to 10 groups, or from 7 to 9 groups. These groups are linearly and sequentially disposed along a length of the first side 31 or first light input surface 31, as illustrated in FIG. 3.

In the illustrated embodiment, the plurality of second light sources 34 or left eye image solid state light source 34 is divided into three groups 34a, 34b, 34c. Each group 34a, 34b, 34c has any useful number of light sources that are simultaneously turned on and off as a group. More than three groups are possible and may be preferred to increase the ON time for any particular group as a fraction of the image display time; however, the example of three groups illustrates the general concept. In other embodiments, the plurality of second light sources 34 or left eye image solid state light source 34 is divided into more than three groups such as, for example, four, five, six, seven, eight, nine, or ten groups or more, as desired. In one particular embodiment, the plurality of second light sources 34 or left eye image solid state light source 34 is divided into 6 to 10 groups, or from 7 to 9 groups. These groups are linearly and sequentially disposed along a length of the second side 33 or second light input surface 33, as illustrated in FIG. 3.

As illustrated in FIG. 3, each plurality of first light sources 32 or right eye image solid state light source 32 groups 34a, 34b, 34c has a corresponding and opposing plurality of second light sources 34 or left eye image solid state light source 34 group 34a, 34b, 34c, respectively. Thus, RIGHT 1, 32a group has a corresponding and opposing LEFT 1, 34a group, RIGHT 2, 32b group has a corresponding and opposing LEFT 2, 34b group, RIGHT 3, 32c group has a corresponding and opposing LEFT 3, 34c group. Only one of the corresponding and opposing groups illuminates the light guide at one time.

Following this scenario of three corresponding and opposing groups, when a second image (Left image of Frame 1) is starting to be displayed the RIGHT 1, 32a light source group is turned off. A vertical rise in the FIG. 4 and FIG. 5 graph lines indicate that the light source is ON or the image is being provided to the LCD for display, and a vertical descent in the FIG. 3 and FIG. 4 graph lines indicate that the light source is OFF or the image is no longer being provided to the LCD for display. After the top ⅓ of the image is replaced by the second image (Left image of Frame 1) the LEFT 1, 34a light source group is turned on and the RIGHT 2, 32b light source group is turned off. After the second ⅓ of the image is replaced, the LEFT 2, 34b light source group is turned on and the RIGHT 3, 32c light source group is turned off. This sequence continues as the alternating right and left image are displayed. This drive method allows the image transition to occur while no light is available at that portion of the LCD for display; it also allows the light to stay on a maximum amount of time enhancing the brightness of the display.

Figure 4:
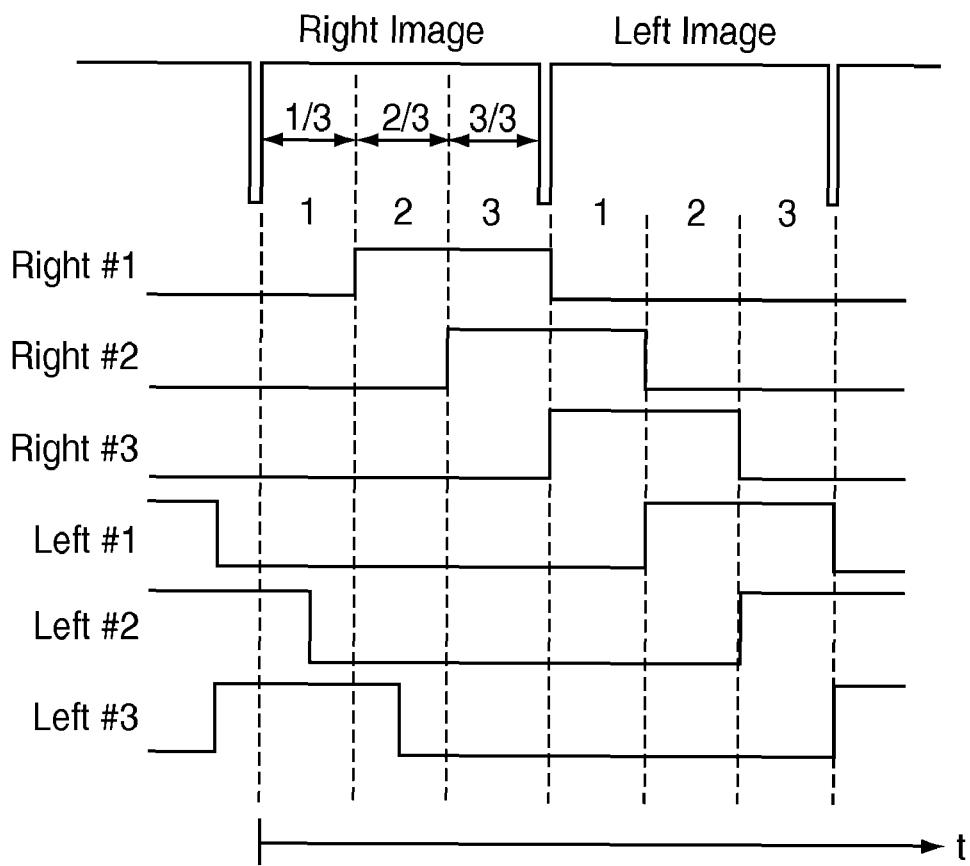
FIG. 4 is an illustrative scanning backlight timing diagram for a 3D liquid crystal display apparatus.

One illustrative scanning backlight timing diagram for a 3D liquid crystal display apparatus is shown in FIG. 4. The plurality of first light sources 32 or right eye image solid state light source 32 (three groups 32a, 32b, 32c) light the Right Image and the plurality of second light sources 34 or left eye image solid state light source 34 (34a, 34b, 34c) light the Left Image.

The plurality of first light sources 32 or right eye image solid state light source 32 groups 32a, 32b, 32c are turned on and off in sequential order (i.e., 32a then 32b then 32c) to illuminate the Right Image and the plurality of second light sources 34 or left eye image solid state light source 34 groups 34a, 34b, 34c are turned on and off in sequential order (i.e., 34a then 34b then 34c) to illuminate the Left Image, as shown in FIG. 4. Thus, the plurality of first light source 32 groups (i.e., 32a then 32b then 32c) are turned on or off from top to bottom and then the plurality of second light source 34 groups (i.e., 34a then 34b then 34c) are turned on or off from top to bottom. This timing sequence is described herein as turning on or off each group sequentially in an alternating order between the first and second sides.

FIG. 4 illustrates this scanning backlight timing sequence where corresponding opposing light source groups (i.e., 32a and 34a; 32b and 34b; 32c and 34c) are both turned off (e.g., not transmitting light into the light guide) for a specified time interval. In this embodiment, this specified time interval is substantially equal to the image frame rate time interval, T displayed or provided on the 3D liquid crystal display panel divided by the total number of groups, N (i.e., three groups in this embodiment). Thus, the corresponding opposing light source groups Right 1 and Left 1 (i.e., 32a and 34a) are both OFF for the first T*⅓ time interval of the Right Image display.

Figure 5:
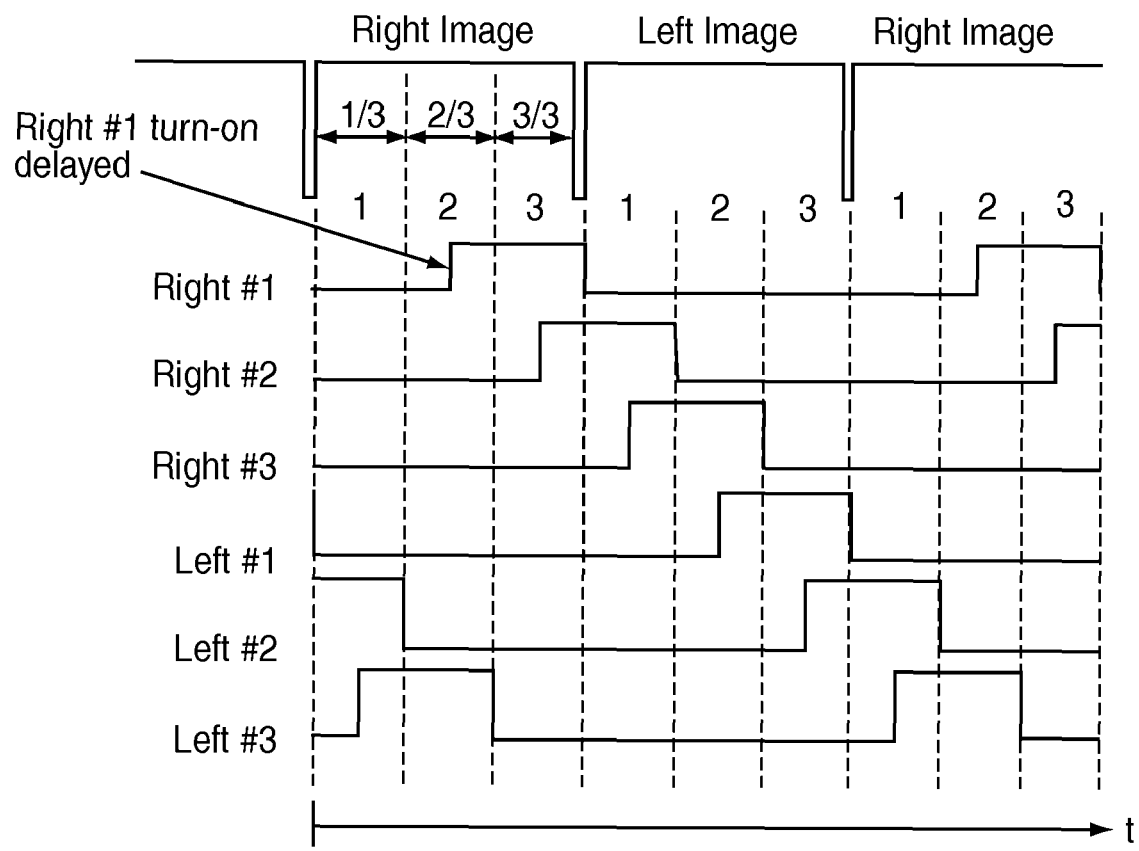
FIG. 5 is another illustrative scanning backlight timing diagram for a 3D liquid crystal display apparatus.

In addition to being a sample-and-hold devices, LCD panels have a relatively long (compared to CRT) response time. That is the time to change from the old picture level to the new picture level can be several milliseconds to 10 milliseconds or more. Since this response time is a significant portion of the time required to display a completely new image, an additional embodiment of the disclosed scanned 3D display backlight timing scheme is illustrated in FIG. 5. This timing sequence is similar to the timing sequence described in FIG. 4, except for the specified time interval (that opposing light source groups, described above) is greater than the image frame rate time interval, T displayed or provided on the 3D liquid crystal display panel divided by the total number of groups, N (i.e., three groups in this embodiment). Thus, the corresponding opposing light source groups Right 1 and Left 1 (i.e., 32a and 34a) are both OFF for the first time interval greater than T*⅓ time interval of the Right Image display.

To assist in reducing 3D image "ghosting," due to the response time of the LCD the point where a group is turned ON can be delayed. As shown in the timing diagram of FIG. 5, the Right 1 group, rather than being turned ON immediately after the first third of the image is drawn, is turned ON after a delay which can be dependent on the response time of the LCD panel being used. The timing diagram of FIG. 5 shows the Right 1 group being turned ON approximately half-way into the drawing of the second third of the image, but the delay time can be set to any amount necessary to eliminate "cross-talk" or "ghosting" caused by having the incorrect light source illuminate the displayed image. The same is true for each group. In many embodiments, the LCD has a response time of less than 10 msec, or less than 8 msec, or less than 3 msec. In addition, these embodiments can utilize light sources that are sufficiently collimated to prevent the light from "fanning" out across the entire light guide aperture.

Thus, embodiments of the STEREOSCOPIC 3D LIQUID CRYSTAL DISPLAY APPARATUS WITH SCANNING BACKLIGHT are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A scanning backlight for a stereoscopic 3D liquid crystal display apparatus, comprising:
   a light guide having a first side and a second side opposite the first side, and having a first substantially planar surface extending between the first and second sides and a second substantially planar surface opposite the first surface, wherein the first surface substantially re-directs light and the second surface substantially transmits light;
   a plurality of first light sources arranged along the first side of the light guide for transmitting light into the light guide from the first side; and
   a plurality of second light sources arranged along the second side of the light guide for transmitting light into the light guide from the second side,
   wherein, the first light sources are divided into a plurality of first groups where each of the first groups are linearly and sequentially disposed along a length of the first side and the second light sources are divided into a plurality of second groups where each of the second groups are linearly and sequentially disposed along a length of the second side, each first group having a corresponding and opposing second group, and each of the first groups are sequentially and selectively turned on and off linearly and sequentially along the length of the first side and each of the second groups are sequentially and selectively turned on and off linearly and sequentially along the length of the second side where only the first group or corresponding and opposing second group selectively transmits light into light guide at one time.

2. A scanning backlight for a stereoscopic 3D liquid crystal display apparatus according to claim 1, wherein the first plurality of light sources and second plurality of light sources each comprise a light emitting diode.

3. A scanning backlight for a stereoscopic 3D liquid crystal display apparatus according to claim 1, wherein the first groups and the second groups selectively transmit light into the light guide based upon whether a right or left image is displayed on the stereoscopic 3D liquid crystal display apparatus.

4. A scanning backlight for a stereoscopic 3D liquid crystal display apparatus according to claim 1, wherein the first groups and the second groups are turned on or off in an alternating order between the first and second sides.

5. A scanning backlight for a stereoscopic 3D liquid crystal display apparatus according to claim 1, further comprising a synchronization driving element electrically coupled to the first groups and the second groups and the synchronization driving element synchronizes turning the first groups and the second groups on or off in an alternating order between the first and second sides.

6. A scanning backlight for a stereoscopic 3D liquid crystal display apparatus according to claim 1, wherein one of the first group and corresponding and opposing second group are both turned off for a specified time interval before that first group or corresponding and opposing second group is turned on.

7. A scanning backlight for a stereoscopic 3D liquid crystal display apparatus according to claim 6, wherein the specified time interval is greater than or equal to an image frame rate time interval, T of the stereoscopic 3D liquid crystal display apparatus divided by a total number of first groups or second groups, N.

8. A scanning backlight for a stereoscopic 3D liquid crystal display apparatus according to claim 6, wherein the specified time interval is greater than an image frame rate time interval, T of the stereoscopic 3D liquid crystal display apparatus divided by a total number of first groups or second groups, N.

9. A stereoscopic 3D liquid crystal display apparatus, comprising:
   a liquid crystal display panel having a frame response time of less than 5 milliseconds;
   drive electronics configured to drive the liquid crystal display panel with alternating left eye and right eye images; and
   a backlight positioned to provide light to the liquid crystal display panel, the backlight comprising:
      a light guide having a first side and a second side opposite the first side, and having a first surface extending between the first and second sides and a second surface opposite the first surface, wherein the first surface substantially re-directs light and the second surface substantially transmits light;
      a first plurality of light sources arranged along the first side of the light guide for transmitting light into the light guide from the first side; and a second plurality of light sources arranged along the second side of the light guide for transmitting light into the light guide from the second side, wherein, the first light sources are divided into three or more first groups where each of the first groups are linearly and sequentially disposed along a length of the first side and the second light sources are divided into three or more second groups where each of the second groups are linearly and sequentially disposed along a length of the second side, each first group having a corresponding and opposing second group, and each of the first groups are sequentially and selectively turned on and off and then each of the second groups are sequentially and selectively turned on and off in a linearly and sequentially along the length of the first side or second side where only the first group or corresponding and opposing second group selectively transmits light into light guide at one time.

10. A stereoscopic 3D liquid crystal display apparatus according to claim 9, further comprising a double sided prism film disposed between the liquid crystal display panel and the backlight.

11. A stereoscopic 3D liquid crystal display apparatus according to claim 9, wherein the first groups and the second groups selectively transmit light into the light guide based upon whether a right or left image is displayed on the stereoscopic 3D liquid crystal display apparatus.

12. A stereoscopic 3D liquid crystal display apparatus according to claim 9, wherein the first groups and the second groups are turned on or off in an alternating order between the first and second sides.

13. A stereoscopic 3D liquid crystal display apparatus according to claim 9, further comprising a synchronization driving element electrically coupled to the first groups and the second groups and the synchronization driving element synchronizes turning the first groups and the second groups on or off in an alternating order between the first and second sides.

14. A stereoscopic 3D liquid crystal display apparatus according to claim 9, wherein one of the first group and corresponding and opposing second group are both turned off for a specified time interval before that first group or corresponding and opposing second group is turned on.

15. A stereoscopic 3D liquid crystal display apparatus according to claim 14, wherein the specified time interval is greater than or equal to an image frame rate time interval, T of the stereoscopic 3D liquid crystal display apparatus divided by a total number of first groups or second groups, N.

16. A stereoscopic 3D liquid crystal display apparatus according to claim 14, wherein the specified time interval is greater than an image frame rate time interval, T of the stereoscopic 3D liquid crystal display apparatus divided by a total number of first groups or second groups, N.

17. A method of displaying a 3D image on a liquid crystal display apparatus comprising:
  providing right and left images to a liquid crystal display panel in an alternating fashion; and
  illuminating the liquid crystal display panel with a scanning backlight, wherein the right image is illuminated by a plurality of first light sources arranged along a first side of a light guide for transmitting light into the light guide from the first side and the left image is illuminated by a plurality of second light sources arranged along a second side of the light guide for transmitting light into the light guide from the first side, and the first light sources are divided into a plurality of first groups where each of the first groups are linearly and sequentially disposed along a length of the first side and the second light sources are divided into a plurality of second groups where each of the second groups are linearly and sequentially disposed along a length of the second side, each first group having a corresponding and opposing second group, and each of the first groups are sequentially and selectively turned on and off and each of the second groups are selectively and sequentially turned on and off linearly and sequentially along the length of the first side or second side where only the first group or corresponding and opposing second group selectively transmits light into light guide at one time.

18. A method according to claim 17, wherein first groups and second groups are turned on or off in an alternating order between the first and second sides.

* * * * *